July 28, 1942.  M. H. RHODES  2,291,560

ATTACHMENT MEANS

Filed Oct. 28, 1940

Marcus H. Rhodes,
Inventor.
Haynes and Koenig
Attorneys.

UNITED STATES PATENT OFFICE 2,291,560

ATTACHMENT MEANS

Marcus H. Rhodes, Hartford, Conn., assignor to M. H. Rhodes, Inc., Hartford, Conn., a corporation of Delaware Application October 28, 1940, Serial No. 363,131

2 Claims. (Cl. 287—53)

This invention relates to attachment means, and with regard to certain more specific features, to attachments for control handles, knobs, pointers, indicators and the like.

Among the several objects of the invention may be noted the provision of an attachment which will provide for pushing a handle or the like onto an arbor for snugly holding the handle, but which permits the handle to be easily removed in case of the necessity for replacement or repair; the provision of a device of the class described which though it permits axial application and removal of the handle, without tools, will not permit it to loosen under rotary twist or fall off in service; the provision of a device of this class employing a simple arbor form; the provision of a device of the class described which under no circumstances will permit the knob or handle to rotate on the arbor from the position at which the knob was originally set; and the provision of a device of the class described which may be mounted in ordinarily frangible materials without breakage. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which are illustrated two of various possible embodiments of the invention, Fig. 1 is a plan view of a knob to which the invention is applied;

Similar reference characters indicate corresponding parts throughout the several views of the drawing.

Figure 1:
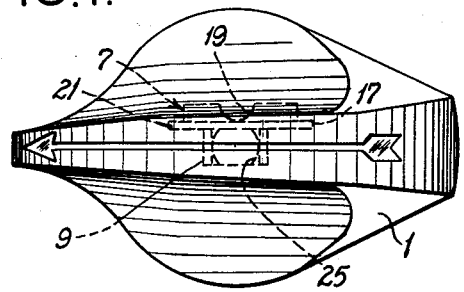

Referring to the drawing, numeral 1 indicates what will hereinafter be referred to as a handle, and which is representative of the various devices which may be attached, such as knobs, pointers, indicators and the like. It is often desirable that handles of this type be formed of materials which are frangible, these materials being chosen because of various desirable properties, such as appearance, or heat-insulating properties, or electrical insulating properties or the like. Such materials may for example be plastics, porcelain, hard rubber or the like.

The back (or underside) of the handle is shown at 3, and in this is arranged a circular recess 5. At the bottom of the recess is a depression indicated generally by the numeral 7, and which in particular consists in a short rectangular portion 9 having an inlet beveled as shown at 11. The length of this rectangle (within the bevels 11) is only slightly greater than the diameter of the arbor 25, to be inserted.

Next to the short rectangular depression 9 is another rectangular depression 13 which is narrower and more elongate in form than rectangle 9. Depression 13 has shelf portions 15 providing narrow slots 17 which define the ends of a long rectangle between rectangles 9 and 13. On the side of the rectangular depression 13 (on which are also the shelves 15) is formed a semi-cylindrical protrusion or boss 19.

Figure 5:
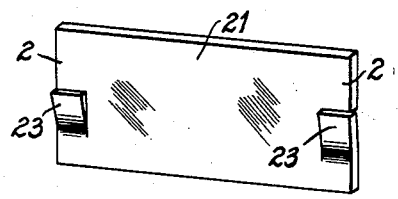
Fig. 5 is a perspective view of a spring holding plate.
Figure 2:
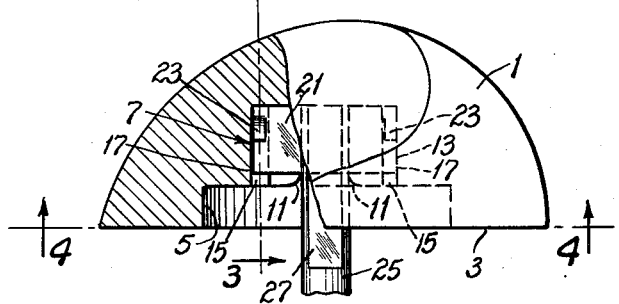
Fig. 2 is a front elevation of the construction of Fig. 1, parts being broken away to show a partial section.

In the notches 17 are placed the ends 2 of a metallic spring insert plate 21. From the edges of the insert plate are struck out or lanced spring tabs 23 providing a wedge-like form, as shown in Fig. 5. The size of the spring insert plate 21 is such that the ends may slide into the notches 17 while the wedge-like tongues or tabs 23 springingly engage the shelf portions 15 to prevent withdrawal. The narrow portions of the wedge-like tabs 23 enter notches 17 foremost and the wider rear portions grip to prevent withdrawal. This encloses or completes the rectangle 9 and provides a socket for the reception of the arbor 25 to be accommodated.

Figure 4:
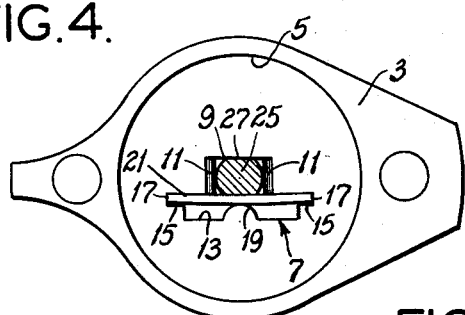
Fig. 4 is a horizontal section taken on line 4—4 of Fig. 2.

The arbor 25 is flat on two sides, as indicated at 27, for springingly slipping into said rectangular recess 9. The springing fit is provided by the spring plate 21. The resulting deflection of the spring insert 21, as a beam, is limited by the boss 19, as indicated in Fig. 4. This prevents overtensioning or weakening of the spring and prevents weakening of its holding power on the flat side of the arbor 25, as inadvertently happens at times in normal settings and occasionally happens by abusive manipulation.

Figure 6:
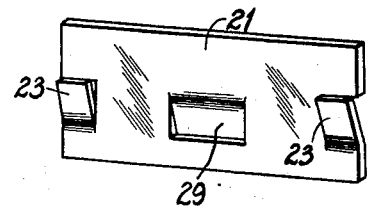
Fig. 6 is a view similar to Fig. 5 showing another form of the spring holding plate.
Figure 7:
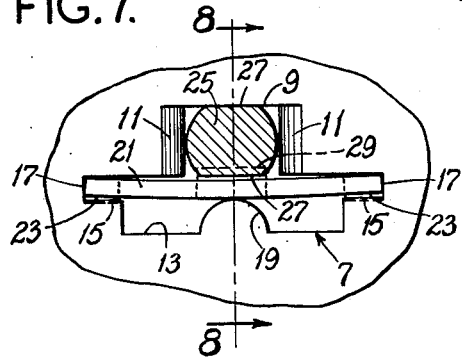
Fig. 7 is a view similar to Fig. 4, but enlarged, showing a detail of how the holding spring of Fig. 6 is applied; and, Fig. 8 is a vertical section taken on line 8—8 of Fig. 7.
Figure 8:
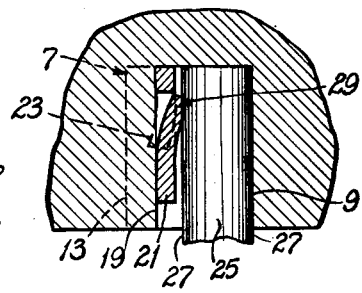

In Figs. 6, 7 and 8 is shown a variation in which like numerals designate like parts. The additional feature is the lancing or striking out of another tongue 29 in the center of spring plate 21, in a direction opposite to the tongues 23. Thus, when the spring member 21 is inserted as shown in Fig. 7, the tongue 29 exerts pressure against one flat side 27 of the arbor 25 when the arbor is inserted into the rectangle 9. The boss 19 again limits the springing action to a proper amount. The deflections shown in Figs. 7 and 8 are exaggerated for purposes of description.

Figure 3:
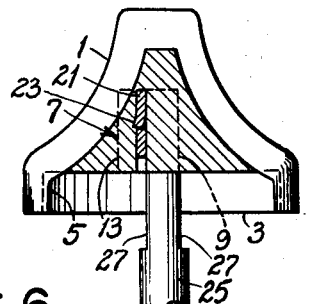
Fig. 3 is a vertical section taken on line 3—3 of Fig. 2.

As indicated in Figs. 3 and 8, the tongues 23 respond to easy insertion of the members 21, but since they are closely bound in the notches 17, they prevent the spring member 21 from coming out. However, in the case of the flat central portion of the spring of Fig. 5, and in the case of the tongue portion 29 in Fig. 6, the grip on the flat arbor 25 is not enough to prevent a removal of the handle from the arbor 25 upon giving it a substantial pull, as distinguished from the normal endwise forces that it would be subject to in effecting rotary adjustments of the handle 1.

The invention avoids the use of intricate shapes in the material of the handle, such as screw threads or the like. Also, no excessive local stresses are brought about in the handle which would break it, as by screws, bolts or the like. The fit on arbor 25 is pleasingly snug, both in response to application of the handle and to pull for removal, although the pull for removal is substantial enough not to be inadvertently brought about. No tools are required either to apply the handle to the arbor or to remove it and in coming off, the plate 21 is not pulled out.

This invention speeds up assembly several hundred per cent. over that of the ordinary screw-thread devices. It is particularly advantageous where the article is to be reassembled into other apparatus such as gas ranges, washing machines and the like.

The invention eliminates the necessity of slotting the arbor, and slotting is a slow and expensive operation compared to the fast milling operation or the like for making flats 27.

Another advantage is that the flats 27 may more readily be applied to the arbor at the proper angle (desired for the handle on the arbor) than is the case in applying a slot.

Another advantage is that one of the flats 27 engages the material of the handle 1, whereas the other is engaged by the spring plate 21. This means that the handle is held on not only by friction between two metal surfaces (between parts 25 and 21), but also by the friction between a metal surface and the surface of the material from which the handle is made (between parts 25 and 1). This means that there are obtained any desired frictional characteristics of the material which makes up the handle 1. For example the frictional characteristics between a metal arbor 25 and a plastic handle 1 are desirable.

It will be understood that throughout the drawing, where necessary for purposes of illustration, clearances and deflections have been exaggerated.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. An attachment for connecting handles and the like with arbors having two flat portions, each attachment comprising a rectangular recess in the handle adapted to receive in non-rotary and direct frictional engagement on one side a flat portion of the arbor, the opposite flat portion of the arbor being presented to the other side of said recess, said handle having a continuation of said recess adjacent one side and forming notches with an adjacent open portion, a boss in said adjacent open portion, a spring holding member, the ends of which are in said notches and the central portion of which is adjacent one of the flat portions on the arbor and the boss, resilient wedge-like means struck from the ends of said holding member and being respectively movable with the narrow portions foremost into the notches to permit easy insertion of the spring holding member but to resist removal of the spring holding member by gripping in the notches from the wider rear portions of the wedge-like means, and resilient means struck from the center of the holding member and engageable with a flat portion of the arbor.

2. An attachment for connecting handles and the like with arbors, said arbors having two flat portions, each attachment comprising a rectangular recess in the handle adapted to receive in non-rotary direct frictional engagement on one side a flat portion of the arbor, the opposite flat portion of the arbor being presented close to the plane of the other side of the recess, said handle having a continuation of said recess adjacent the last-named side and forming notches with an adjacent open portion, a boss in said adjacent open portion, a spring holding member forming a beam borne at the ends in said notches and in between springingly engaging the adjacent flat portion of the arbor, the deflection of the central portion of the holding member by any arbor rotation being limited by said boss, resilient wedge-like means struck from the ends of said holding member and being respectively movable with the narrow portions foremost into the notches to permit easy insertion of the spring holding member but to resist removal of the spring holding member by gripping in the notches from the wider rear portions of the wedge-like means.

MARCUS H. RHODES.